# United States Patent Office 3,154,545
Patented Oct. 27, 1964

3,154,545
PROCESS FOR PREPARING CYANURIC ACID FROM UREA CYANURATE
William F. Symes, Webster Groves, and Steve Vazopolos, St. Louis, Mo., assignors to Monsanto Company, a corporation of Delaware
No Drawing. Filed Jan. 12, 1962, Ser. No. 165,957
9 Claims. (Cl. 260—248)

The present invention relates to the preparation of cyanuric acid and more particularly relates to novel and improved processes for the manufacture of cyanuric acid. The present invention further relates to a novel continuous process for the preparation of cyanuric acid in high yields. The present invention also relates to urea cyanurate and to the preparation of cyanuric acid therefrom.

In the past cyanuric acid has been prepared by a variety of procedures, the more common of which is to merely melt and heat, e.g. pyrolyze urea at atmospheric pressure above the temperature range at which it decomposes, (e.g. 180° C.–250° C.) in accordance with the following reaction.

I

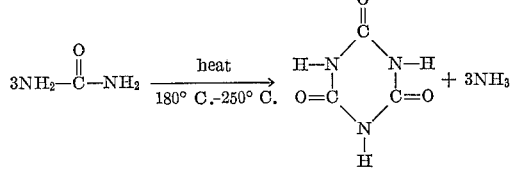

However, during the heating of urea at these temperatures this reaction is not the only reaction that occurs. When urea per se is heated to temperatures above its melting point for relatively short periods of time it may also, and usually does, partially volatilize, isomerize to ammonium cyanate, decompose into ammonia, water and carbon dioxide and polymerize to produce a range of products in addition to and mixed with cyanuric acid. Such products include ammeline, ammelide, melamine, biuret, triuret and dicyandiamide. Other products which may be formed include ammonium carbonate, cyanic acid and polymers thereof. The final product thus formed is a crude reaction product containing cyanuric acid and substantial quantities of two or more of the above impurities intermixed therewith.

It has also been proposed to add ammonium chloride or zinc chloride, as catalysts, to the urea to increase the yields of cyanuric acid and to reduce the impurities therein. Such procedures have been described in the "Journal of the Society of Chemical Industry," vol. 67, page 66 (1948), and in U.S. Patent No. 2,527,316 issued October 23, 1960, to Johnstone S. Mackay.

However, when cyanuric acid is formed from urea by pyrolysis of the molten urea to a solid product, with or without such a catalyst, the product so formed hardens and sets up in the synthesis vessel or reactor causing severe operational difficulties. Solids first form at the heating surface, impeding the heat conductance, thereby decreasing the rate of reaction and these solids often make it impossible to drive the reaction to completion even with increased reaction times. Additionally, the product cake, comprising crude cyanuric acid, molten urea agglomerates and molten urea, clings tenaciously to the surface within the reactor, including glass walled surfaces, resulting in intermittent operation. Furthermore, such processes yield a product comprising substantial amounts of ammelide and other impurities and the desired cyanuric acid is usually obtained in yields of 60% or less, based on the urea charged. This represents an uneconomical utilization of the urea feed and also necessitates the use of relatively expensive purification procedures.

It has also been proposed heretofore, in U.S. Patent 2,943,088, issued June 28, 1960, to Richard Howard Westfall to prepare cyanuric acid by heating urea at a temperature of from 240° C. to 360° C. while continuously moving it so that it melts and deammoniates through a viscous plastic state into a hard solid state to form a crude reaction product in the form of small granules consisting largely of cyanuric acid, ammelide, ammeline, and minor quantities of other impurities. According to this patent, the reaction (e.g. conversion to cyanuric acid by deammoniating urea through a viscous plastic state) can be carried out with urea alone while continuously tumbling the moving mass past a heat exchange surface at a speed of 50 to 1000 lineal inches per minute so that the urea deammoniates to form the above reaction product which breaks up into small free-flowing granules. The reaction can also be carried out by adding fresh urea with at least twice its weight and up to about six times its weight of the crude cyanuric acid granules and feeding the mixture through a heated reaction zone during which the urea is deammoniated through a viscous plastic state to form the above mentioned crude reaction product consisting of cyanuric acid, ammelide, ammeline and other impurities. However, the reaction described in this patent often results in very crude products containing as high as 42% of the above mentioned impurities (e.g. ammelide, ammeline and the like) and yields as low as 58% of cyanuric acid.

In accordnace with the present invention it has unexpectedly been found possible to prepare cyanuric acid in high yields and substantially free of most of the impurities formed in the prior art processes.

It is one object of the present invention to provide novel processes for preparing cyanuric acid.

It is also an object of this invention to provide novel, improved processes whereby pure or substantially pure cyanuric acid may be prepared.

It is a further object of the present invention to provide a novel process of preparing cyanuric acid from urea cyanurate.

It is a still further object of the present invention to provide improved processes, including improved continuous processes, for the manufacture of cyanuric acid in high yields and to minimize or eliminate the disadvantages and problems of the prior art processes hereinbefore referred to.

Additional objects and advantages of the present invention will become apparent from the following description and the appended claims.

In accordance with the processes of the present invention cyanuric acid may be conveniently and economically prepared by heating urea cyanurate in an inert atmosphere and at substantially atmospheric pressure in which the following reaction usually takes place.

II

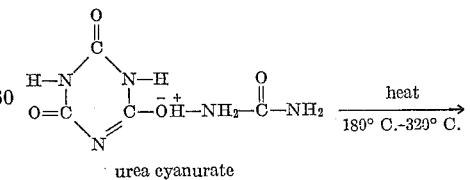

urea cyanurate

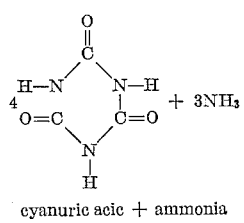

cyanuric acic + ammonia

Surprisingly it has been found that, by the process of the present invention, cyanuric acid per se or a mixture of cyanuric acid and only a minor amount of ammelide, substantially without other impurities, is usually obtained when urea cyanurate is heated in air at substantially atmospheric pressure at a temperature in the range of from about 180° C. to about 320° C.

When urea cyanurate is heated in the range of from about 180° C. to about 220° C., cyanuric acid is obtained and this product is usually free or substantially free of impurities such as ammelide, ammeline, biuret, dicyandiamide melamine and the like. On the other hand, when urea cyanurate is heated at a temperature of from about 220° C. to about 320° C., a mixture of cyanuric acid and a minor amount of ammelide, substantially free of impurities such as ammeline, biuret, melamine, etc., is usually obtained. The amount of ammelide in the mixture of cyanuric acid and ammelide, may vary to some extent, usually from about 1% to about 20%, based on the weight of the mixture, and depends to a large extent upon the heating temperature employed. Thus, at temperatures below 260° C. the amount of ammelide will be less than 10% and usually less than 5% whereas at temperatures above about 260° C., that is, at temperatures between about 260° C. and about 320° C., the mixture will generally contain from about 10% to about 20% by weight of ammelide. When urea cyanurate is heated at temperatures above 320° C. the amount of ammelide may be increased to as high as 25% and, additionally, other impurities such as those described in the prior art may be formed in the mixture. On the other hand, when urea cyanurate is heated at temperatures below 180° C. only small amounts, if any, cyanuric acid is formed and the conversion of urea cyanurate to cyanuric acid does not occur or does not substantialy occur at such temperatures.

The heating time required for the conversion of urea cyanurate to cyanuric acid may vary to some extent depending upon the amount of urea cyanurate present and the temperature employed. Generally speaking an increment of urea cyanurate may be converted to cyanuric acid at temperatures of between 250° C. and 290° C. in about one third the time required for the conversion of urea cyanurate to cyanuric acid at temperatures of between 180° C. to 220° C.

As noted hereinbefore, urea cyanurate can be economically converted to cyanuric acid when heated in air. However, since the conversion almost always results in the evolution of three mols of $NH_3$, for each mol of cyanuric acid formed, the conversion is generally carried out, in practice, in a mixture of air and a small amount usually less than 20% by volume of $NH_3$ gas evolved during the conversion of urea cyanurate to cyanuric acid. Higher quantities of $NH_3$ will not adversely affect the conversion, although if the $NH_3$ content of the air exceeds 70% by volume there is a chance that impurities such as melamine may be formed in addition to cyanuric acid. The conversion of urea cyanurate to cyanuric acid may also be carried out in an atmosphere of some other inert gas such as, for example, nitrogen gas, but there is no advantage to be gained by such procedure.

Although urea cyanurate can be converted to urea at pressures slightly above atmospheric pressure, say about 10 atmospheres of pressure, conversion of the urea cyanurate at atmospheric pressure is preferred since some by-product impurities such as melamine and larger quantities of ammelide are formed in addition to cyanuric acid at higher than atmospheric pressures. Also, urea cyanurate can be converted to cyanuric acid at sub-atmospheric pressures but there is a danger that substantial quantities of urea will be lost through volatilization of the urea from the urea cyanurate, thereby adversely affecting the yields of cyanuric acid.

Urea cyanurate, from which cyanuric acid can be obtained in accordance with the processes of this invention, is a white crystalline solid which is highly water soluble. According to Beilstein, Original Edition, Volume 26, Page 242, urea cyanurate, when dissolved in water, dissociates into urea and cyanuric acid. It cannot then be re-obtained from such solution unless and until a large excess of urea, (e.g. a saturation concentration) is added to the solution whereupon urea cyanurate crystals precipitate and can be recovered in pure form therefrom. The crystals of urea cyanurate have a distinct X-ray diffraction pattern which have the following interplanar spacings.

X-RAY DIFFRACTION PATTERN OF CRYSTALLINE UREA CYANURATE

*Angle $2\theta$*

28.0
12.6
19.5
12.4
25.4
30.3
26.7
31.3
29.3

Also, according to Beilstein urea cyanurate can be prepared by adding cyanuric acid to a heated, supersaturated aqueous solution of urea. Urea cyanurate crystallizes from this solution upon cooling and the crystals can then be isolated from the urea solution by filtration or centrifugation.

In accordance with one embodiment of the present invention it has been found possible to prepare urea cyanurate in substantially pure form, without an excess of urea and accompanying decomposition products thereof and under substantially non-aqueous conditions. It has presently been found that urea cyanurate may be simply and economically prepared by contacting urea and cyanuric acid at a temperature in the range of from about 180° C. to about 320° C., the urea being contacted with hot cyanuric acid in an amount and at a rate sufficient only for the urea to react with the cyanuric acid and to form urea cyanurate. The urea cyanurate so formed can then be converted to cyanuric acid as hereinbefore described.

If desirable, the urea may be contacted with, for example, the cyanuric acid in a variety of forms including, for example, powdered urea, molten urea or an aqueous solution usually containing 70% or more by weight of urea, provided the urea is added to or contacted with the cyanuric acid in an amount and at a rate such that an excess of urea is never present or in contact with the cyanuric acid and thus does not deammoniate through a viscous plastic state. The urea may be contacted with the hot cyanuric acid in solid form, for example, as a powdered dust or in liquid form, for example, as molten urea or a concentrated aqueous solution or slurry containing more than 70% by weight of urea. When the urea is contacted with the cyanuric acid in liquid form it may be contacted as a continuous stream or in the form of finely divided droplets.

When urea is contacted with cyanuric acid as a powder or dust, in the amounts and under the conditions hereinafter described, urea cyanurate is usually formed in the solid state and the urea does not usually pass through a molten state. When molten urea is contacted with cyanuric acid either as a stream or in the form of finely divided droplets, under proper conditions of feed rate and temperature, the urea usually reacts substantially instantaneously with a portion of the cyanuric acid to form solid urea cyanurate. When an aqueous solution or aqueous slurry of urea is contacted with the cyanuric acid at temperatures above 180° C. the water is instantly volatilized into the atmosphere and a non-aqueous reaction between molten urea and cyanuric acid occurs instantaneously resulting in the formation of urea cyanurate.

At the beginning of the reaction urea is initially added to heated cyanuric acid and reacts instantaneously with cyanuric acid to form urea cyanurate. As additional urea is added it is thus added to a mixture of cyanuric acid and urea cyanurate and reacts only with the cyanuric acid present in the mixture. Generally speaking the urea is contacted with cyanuric acid or the mixture of cyanuric acid and urea cyanurate at such a rate that the weight ratio of the solid product (e.g. cyanuric acid or a mixture of cyanuric acid and urea cyanurate) to urea is in the range of from 10:1 to 150:1 preferably a range of 20:1 to 60:1.

The cyanuric acid employed is a solid product and may be powdered, granular or in the form of pellets. As will be hereinafter evident, the cyanuric acid is preferably employed as a free-flowing solid material and desirably in the form of agglomerates, granules, or pellets.

In the preparation of urea cyanurate it has presently been found desirable and preferable to heat the cyanuric acid prior to and during the addition of the urea at a temperature in the range of from about 180° C. to about 320° C. At such temperatures a substantially instantaneous reaction of urea and cyanuric acid occurs to form solid urea cyanurate, and the hereinbefore mentioned undesirable impurities, due to the deammoniation of urea, are not formed in significant amounts.

If the cyanuric acid, to which the urea is added, is maintained at a temperature below 180° C., that is between about 135° C. and 180° C. the reaction between the urea and cyanuric acid usually occurs at such a slow rate that the resulting mixture may contain an excess of urea, which excess, will often pyrolyse and/or deammoniate to form products such as ammonium cyanurate, biuret, and the like. If the cyanuric acid is maintained at a temperature above 320° C. substantial amounts of urea may be lost through volatilization, but more importantly the urea cyanurate will also usually contain significant quantities of impurities such as ammeline, ammonium cyanurate, biuret and the like in addition to ammelide.

Generally speaking it has been found desirable to maintain the temperature of cyanuric acid in the range of about 180° C. to about 220° C., preferably about 200° to 220° C., when pure or substantially pure urea cyanurate is sought. However, when urea cyanurate containing a minor amount (e.g. less than 20% by weight of the mixture of two compounds) of ammelide is not objectionable, the cyanuric acid may be maintained at a temperature in the range of from about 220° C. to about 320° C. preferably a temperature of about 250° C. to about 300° C.

It is desirable, in accordance with one embodiment of this invention, to add molten urea, e.g. urea at a temperature above its melitng point of 132.7° C. to powdered or granular cyanuric acid, or a mixture of cyanuric acid and urea cyanurate, which has been heated to the above described temperatures. During the addition of urea, the cyanuric acid or the mixture of cyanuric acid and urea cyanurate, is preferably stirred or agitated, suitably by mechanical means such as, for example, by reciprocal vibration, in a mechanical vibrator, or by tumbling. Other agitating or stirring means may be used such as, for example, a layer or film of cyanuric acid may be caused to move as a moving bed by rotation in a drum or by moving on a conveyor belt.

It has been found advantageous to heat the urea to a temperature in the range of from just above its melting point, e.g. a temperature of from about 135° C. to about 180° C., preferably a temperature in the range of from about 140° C. to about 160° C., just prior to contacting the urea with cyanuric acid. If the urea is maintained at a temperature of above 180° C. prior to such contact some pyrolysis of the urea will occur prior to the addition of the urea to cyanuric acid resulting in the presence of impurities in the urea cyanurate. Also, some of the urea usually volatilizes at temperatures above 180° C.

As noted hereinbefore it is important that urea be added to cyanuric acid in an amount and at a rate sufficent only for all, or substanially all, of the urea to react with the cyanuric acid. It has also been noted that the amount and rate at which the urea is added will depend upon factors such as the amount of cyanuric acid and the temperatures of the urea and cyanuric acid. In general, the amount and rate of addition of the urea is such that the weight ratio of urea to cyanuric acid (or the weight ratio of urea to a mixture of cyanuric acid and urea-cyanurate where the reaction is already being carried out) is usually in the range of from about 1:10 to about 1:250 preferably 1:10 to 1:100 more preferably 1:20 to 1:60. A weight ratio within this range has been generally found to result in the formation of substantially pure urea cyanurate or, depending upon the temperature, a mixture of urea cyanurate and a minor amount of ammelide and without the formation of appreciable amounts of the impurities hereinbefore mentioned.

The reaction time required to react urea with cyanuric acid will depend to some extent on the temperature of the cyanuric acid, the temperature of the urea, and the amount of these agents employed. In general, when molten urea is added to cyanuric acid in the proper quantities and rates at a temperature between 220° C. and 320° C. the reaction occurs almost instantaneously upon contact of the urea with the cyanuric acid. However, at temperatures below 220° C. the reaction occurs at rates such that the urea must be contacted with the cyanuric acid very slowly or there is some danger that the urea will deammoniate.

As previously noted, cyanuric acid or a mixture of cyanuric acid and a minor amount of ammelide can be readily obtained from urea cyanurate which has been prepared under the above-described procedures and conditions.

When it is desired to convert the mixture, containing substantially cyanuric acid and a minor amount of ammelide, to substantially pure cyanuric acid such conversion may readily be accomplished by methods well known to those skilled in the art such as, for example, by digesting the mixture with a dilute, aqueous solution of a strong acid. Such treatment selectively hydrolyzes the ammelide to cyanuric acid resulting in an increased yield and a product consisting of more than 99.5% of cyanuric acid.

It has presently been found possible to prepare and obtain cyanuric acid, in yields in excess of 90% based on the amount of urea employed, directly from urea by a process which comprises first reacting urea with cyanuric acid to obtain urea cyanurate and thereafter converting the urea cyanurate to cyanuric acid under the conditions hereinbefore described. By so proceeding cyanuric acid per se, or a mixture of substantially cyanuric acid and a minor amount of ammelide are generally obtained. These products are also characterized in being substantially free of other amides, amines, imides, and imines inherent in the products of the prior art processes.

This process may be carried out as a batch process but is more advantageously carried out continuously by adding molten urea to a moving bed of powdered or granular cyanuric acid maintained at the temperatures hereinbefore described. It is particularly preferred to add molten urea in the form of a slowly fed stream or atomized spray to a moving bed of cyanuric acid granules wherein the granules are constantly moving and in a free-flowing state, so that the molten urea is applied to the surface of the cyanuric acid granules to form at least a partial layer or coating of urea cyanurate thereon. The stream or atomized spray and the movement of the moving bed of granular cyanuric acid may be generally controlled so that a relatively uniform coating of urea cyanurate, generally a coating of from 1/64 inch or less to 1/8 inch thick, is formed on the surface of the cyanuric acid granules. Such coating is converted to a coating of cyanuric acid or a mixture of cyanuric acid and a minor amount of ammelide in the bed which, as noted hereinbefore, is preferably maintained at a temperature in the range of about 180° C. to 320° C. It is also preferred that the free-flowing granules of cyanuric acid or a mixture of such granules and granules of cyanuric acid, which are transitorily coated with urea cyanurate, be constantly agitated or tumbled while in a moving bed to provide a uniform temperature therein and thus maintain a uniform conversion rate of the urea cyanurate to cyanuric acid. Such agitation or tumbling also results in a more uniform contact of urea with the surface of the cyanuric acid granules thereby tending to provide a continuous coating of urea cyanurate on such granules.

A particularly advantageous embodiment of the present invention comprises continuously applying molten urea, maintained at a temperature in the range of about 135° C. to 180° C., to the surface of free-flowing cyanuric acid granules in a moving granular bed consisting of a mixture of cyanuric acid granules and such granules having a coating of urea cyanurate thereon. The granular bed is maintained at a temperature in the range of about 180° C. to 320° C., preferably a temperature in the range of from about 220° C. to about 320° C. The molten urea is most suitably applied to the surface of the granules, while the granules are agitated or tumbled in the bed, in an amount and a rate sufficient to react substantially completely with the cyanuric acid on the surface of the granules to form at least a partial coating of urea cyanurate on the granules.

When the urea is initially added to the bed of cyanuric acid granules only a portion of the granules are contacted with the urea and thus after the initial application of urea the bed consists of a mixture of cyanuric acid granules and cyanuric acid granules having a coating of urea cyanurate thereon. As the molten urea is continuously added the surfaces of additional granules become coated with urea cyanurate due to the tumbling of the granules, which exposes the surfaces of uncoated cyanuric acid granules. Concurrently as molten urea is continuously added to the surface of the cyanuric granules the urea cyanurate coating on the coated granules is being continuously converted to cyanuric acid thereby providing a fresh cyanuric acid surface for the formation of additional urea cyanurate coating when such granules are again contacted with urea.

When molten urea is contacted with granules which already have a coating of urea cyanurate thereon, the continuous agitation and tumbling of the granules, results in the urea, on the surface of the coated granules, contacting the surfaces of granules containing unreacted cyanuric acid and additional cyanuric acid granules are thereby coated with urea cyanurate. Thus, a portion of the granules in the moving bed are continuously reacted with urea to form granules coated with urea cyanurate and a portion of the granules which are coated with urea cyanurate are being continuously and simultaneously converted to granules consisting of cyanuric acid or cyanuric acid and a minor amount of ammelide and are available for further reaction with urea, to again form such granules which may again be coated with urea cyanurate. As will be evident hereinafter a portion of the cyanuric acid granules which may contain a minor amount of ammelide are continuously removed from the granular bed.

The foregoing preparation of cyanuric acid may usually be accomplished when the weight ratio of the cyanuric acid granules or the mixture of the above described cyanuric acid granules and cyanuric acid granules having a coating of urea cyanurate thereon is in the range of from 1:10 to 1:250 and preferably in the range of from about 1:20 to 1:60 otherwise unreacted urea will be present in the bed and such unreacted urea will deammoniate to form the impurities hereinbefore referred to.

When molten urea is applied to the cyanuric acid granules at a temperature from between about 180° C. to 220° C. urea cyanurate forms and can be slowly converted to substantially pure cyanuric acid within this temperature range. However, when urea is applied to a bed of cyanuric acid granules or a bed of a mixture of cyanuric acid granules and cyanuric acid granules having a coating of urea cyanurate thereon and maintained at a temperature in the range of from 200° C. to 320° C. the urea cyanurate coating is converted to cyanuric acid and a minor amount e.g. less than 20% by weight, of ammelide. Such ammelide as noted hereinbefore may be readily converted by acid digestion to substantially pure cyanuric acid. When urea is applied to a granular bed which is maintained at a temperature above 250° C. some of the urea volatilizes. However, the volatilized urea can almost always be recovered by condensation and re-used. Also when urea is applied to a granular bed at temperatures above 250° C. usually from about 2% to about 10% of the urea decomposes to $CO_2$ and $NH_3$. However, it has been found desirable and practical to maintain the bed at a temperature in the range of from 250° C. to 300° C. and by so proceeding to obtain cyanuric acid in a yield as much as 95% of that theoretically obtainable based on the urea charged.

The size of the granules of the granular cyanuric acid may vary widely as long as they are free-flowing granules. Thus very small granules having a particle size such that they will pass through a No. 60 mesh U.S. standard screen but are retainable on a No. 80 mesh U.S. standard screen may be employed. On the other hand larger granules or pellets such as, for example, spherical or spheroidal pellets having a diameter greater than one inch may be used. Also granules having varying particle sizes within the above specified ranges are also suitable. As the urea is applied to the surface of the granules at least a partial coating of urea cyanurate is formed, and as this coating is converted to cyanuric acid and the process cycle is repeated the granules become larger. The coating of urea cyanurate formed on the surface of the cyanuric acid granules may be continuous or discontinuous, depending upon the rate of urea fed and the degree of agitation of the granules. However, under proper operating conditions the coating is usually continuous and varies from about 1/64 inch to 1/8 inch in thickness.

In general the size of the granules obtained will depend to some extent, on the character of the heated bed. Usually a greater degree of agitation of the granules within the moving bed is usually required when the granules or a large portion of the granules are small. As stated hereinbefore the heated bed is preferably a moving bed which may be supported by any supporting surface, and preferably a support which will also provide heat and agitation for the cyanuric acid granules during the addition of the urea thereto. Thus, a moving belt or other similar conveyor may be provided with heat exchange source and a vibrating mechanism may be employed. The moving bed may consist of a layer of cyanuric acid granules on the moving belt to which urea may be applied. A reciprocally agitated fixed support such as for example a mechanical shaker or vibrator the same as, or similar to those, used in the tablet making art may be suitably employed as a support for the bed.

A preferred embodiment of a moving heated bed, for use in the processes of the present invention is a heated rotating cylinder having a means, either movable, or fixed, along the axis thereof for the application of urea to the surface of the cyanuric acid granules. Such a rotating cylinder efficiently tumbles and agitates the cyanuric acid granules as the urea is applied to the surface thereof, providing a relatively continuous coating on the surface of the granules. Also, a portion of the urea cyanurate coating which forms almost instantly on the surface of the cyanuric acid granules as the urea is applied breaks away from some of the granules, as the coating is converted to cyanuric acid or cyanuric acid containing a minor amount of ammelide, thereby forming new small granules of cyanuric acid or cyanuric acid containing a minor amount of ammelide which are contacted or coated with urea to form urea cyanurate as hereinbefore described. There is thus provided a continuous method for preparing cyanuric acid, directly from urea and cyanuric acid through the continuous formation of urea cyanurate and the continuous conversion thereof to cyanuric acid.

A preferred embodiment of the rotary cylinder comprises a horizontally mounted rotating cylinder, rotating about its axis and having a means along the axis for the introduction of molten urea, as a stream or as finely divided droplets which is applied to the heated cyanuric acid inside of the cylinder. It has been found advantageous to supply the walls of the cylinder with baffle plates running throughout its length to insure better and more uniform tumbling of the granular reaction product and to aid in the formation of smaller cyanuric acid granules through attrition of the larger granules as above described. The cylinder is preferably closed or partially closed at one or both ends by circular plates either or both having central openings and bolted or otherwise fastened to the walls of the cylinder. When the cylinder has two plates with openings, the opening on one plate preferably has a larger diameter opening than the opening of the other to permit the discharge of the cyanuric acid granules as the reaction mass increases due to the continuous formation of the cyanuric acid.

The cyanuric acid bed may be heated by any well known means, such as for example by a jacket of steam surrounding the entire surface of the rotating cylinder, by electrical resistance heating elements or by the application of any fixed heat source.

The temperature of the wall of the cylinder must be substantially above the temperature of the cyanuric acid bed, which bed is maintained at a temperature in the range of from about 180° C. to 320° C. and wall temperatures from 200° C. to 300° C. above the desired bed temperature are usually adequate to insure the desired temperature. The temperature differential between the cylinder wall and the cyanuric acid bed will also depend upon the temperature of the urea feed and also upon the rate at which the urea is fed.

During the continuous operation of the rotating cylinder in producing cyanuric acid ammonia is constantly formed due to the conversion of the cyanuric acid from urea cyanurate and the cylinder is preferably vented by an off gas tube located at one end of the cylinder and passing through a control opening in an end plate. The hot ammonia gas rises through the tube where it can be collected for other uses. Also, at the higher temperatures, within the ranges hereinbefore described, some of the urea volatilizes. Such urea vapors may also be suitably vented through the off gas tube to a condenser connected thereto where they can be condensed and recycled to form molten urea and re-introduced into the rotary cylinder.

The rotary cylinder is preferably constructed of a ferrous metal such as stainless steel although any other material capable of withstanding temperatures of 600° C. or more may be suitably employed.

A further understanding of the processes of the present invention will be obtained from the following specific examples which are intended to illustrate the invention but not to limit the scope thereof parts and percentages being by weight unless otherwise specified.

EXAMPLE I

Urea cyanurate was first prepared as follows:

Sixty-four grams of powdered cyanuric acid were added over a 1 minute period with stirring, to an aqueous slurry containing 120 parts of urea and 60 parts of water. The slurry was continually stirred during the addition of cyanuric acid and the resultant slurry was heated to boiling for 10 minutes. During this period the urea and cyanuric acid in the slurry were completely dissolved in the water. After solution had occurred the heat was withdrawn and the solution was permitted to cool to room temperature after which it was further cooled to about 10° C. for three hours. During this period a white crystalline material formed in the solution and settled to the bottom of the container. The supernatant liquid which consisted of a saturated aqueous solution of urea was decanted and the crystals were dried. X-ray diffraction analysis of the crystals revealed a diffraction pattern of urea cyanurate hereinbefore described. An elemental analysis of the material showed that it contained 25.4% carbon, 3.8% hydrogen, 37.0% nitrogen and 33.8% oxygen which corresponded substantially to the theoretical elemental content of the urea cyanurate. Ninety-five grams of crystals corresponding to 99% of the theoretical yield of urea cyanurate, based on the cyanuric acid used, was obtained.

Fifty-seven grams of crystalline urea cyanurate so prepared were heated in a stainless steel crucible at a temperature of 210° C. for 150 minutes. During this period ammonia gas was emitted from the crucible, the heating being discontinued when ammonia was no longer given off. A white powdered material weighing 51.5 grams was obtained which upon analysis proved to consist of 99.99% of cyanuric acid. The yield based on the theoretical conversion of cyanuric acid to urea cyanurate was greater than 99%. At no time did the urea cyanurate melt or liquify.

Analysis of the white powder consisted of first dissolving a one gram portion of the cyanuric acid in 100 ml. of water heated to a temperature of 40° C. No precipitate was formed indicating that no substantial quantity of ammelide was present. The amount of cyanuric acid was then determined alkalimetrically by standard procedures. Ultraviolet absorption of the cyanuric acid solutions showed that only a trace, e.g. less than 0.01% of ammelide was present.

EXAMPLE II

Fifty-seven grams of crystalline urea cyanurate prepared as described in Example I are heated in a stainless steel crucible at a temperature of 260° C. for 60 minutes. Ammonia gas began to be liberated as the temperature reached 180° C. and continued to be liberated for about 58 minutes after the temperature had reached 260° C. A white agglomerated reaction mass weighing 49.8 grams was obtained upon cooling the crucible.

A one gram portion of the material was analyzed alkalimetrically for cyanuric acid and by UV absorption analysis for ammelide and was found to consist of 89.4% cyanuric acid and 10.5% of ammelide.

The remainder of the reaction mass was ground and placed in a flask containing 100 grams of a 10% aqueous solution of sulfuric acid, the flask being equipped with an electric stirrer and a thermometer. The contents of the flask were heated and maintained at 101° C. for 480 minutes after which time the contents were cooled to 5° C. A white solid precipitate was separated from the liquid phase by filtration. The liquid was concentrated to about ⅓ of its original volume in a partial vacuum at a temperature of about 75° C. re-cooled and additional solids removed. The solids, after drying to constant weight at 50° C., weighed 47.7 grams. Upon analysis this material was found to consist of 99.98% cyanuric acid. The yield of cyanuric acid was 92.44% of the yield of cyanuric acid theoretically obtainable from the original urea cyanurate.

EXAMPLE III

One hundred and three grams of granular cyanuric acid, consisting of round granules of from between 1/16 inch and 1/8 inch diameter were placed in a thermostatically controlled electrically heated 6 inch diameter crucible mounted on a mechanical vibrator. The thermostatically controlled heating element was set at 210° C. and the cyanuric acid granules were heated to that temperature. Thereafter, six grams of molten urea at a temperature of 140° C., are atomized at a constant feed rate over a 10 minute period and sprayed downwardly from a position three inches above the bed of cyanuric acid during which time the granules were constantly agitated by the vibrator. The urea changed from its molten state to a solid immediately upon contact with the cyanuric acid granules. The heat and vibration were continued for about 30 seconds until a slight trace of ammonia gas was evident after which time the heat and vibration were discontinued. The bed of granules weighed approximately 109 grams. X-ray diffraction analysis of the granules revealed diffraction patterns showing that the granules consisted of a mixture of cyanuric acid and urea cyanurate. The granules were replaced in the crucible and again heated to a temperature of 210° C. for 180 minutes. After this period the granules were analyzed and found to contain 99.99% cyanuric acid.

The above process cycle was repeated 20 times using the same granules which had increased in size with each cycle until the diameters of the cyanuric acid granules had increased in size to diameters ranging from 3/16" to 3/8" and the total weight of the cyanuric acid had increased from the original 103 grams to 250 grams of substantially pure cyanuric acid which did not require digestion.

The above process was a solid reaction and no observable molten urea was present on the cyanuric acid granules at any time.

EXAMPLE IV

One hundred eighty pounds of spheroidal cyanuric acid granules varying in diameter from 1/20" to 1/4", wherein 65% of the granules had a diameter of between 1/8" to 1/4" were placed in the bottom of the horizontally mounted 3/8" thick stainless steel cylinder, 3 feet long and 2 feet in diameter. The cylinder was fitted at each end with circular stainless steel plates having the same thickness. The cylinder was horizontally mounted in a support such that it was rotatable about its horizontal axis. One of the end plates was provided with a central opening through which a horizontally movable urea feed tube, flexibly connected to a source of molten urea, was mounted. Also through this opening was mounted an off gas tube proximally connected with a urea condenser for condensing and recovering urea vapors. The off gas tube was distally connected to a trap for the recovery of $NH_3$ gas. The other end plate was provided with a central opening for the discharge and removal of cyanuric acid granules. The internal surface of the cylinder was provided with six, equally spaced, one inch high baffle plates extending centrally towards the axis.

The cylinder containing 180 pounds of cyanuric acid granules was heated to a wall temperature 500° C. by means of an array of gas burners mounted just below the cylinder and parallel with the axis thereof so that the temperature of the bed of cyanuric acid granules was maintained at 270° C., ±5° C. when the cylinder was rotated at a speed of 20 r.p.m. The cylinder was rotated by a gear chain drive powered by an electric motor and the rotation insured a free-flowing mobile bed of cyanuric acid granules in the bottom of the cylinder.

Molten urea at a temperature of 150° C., was continuously applied to the surface of the cyanuric acid granules through the end of urea feed tube which moved horizontally and reciprocally from one end of the cylinder to the other. The rate at which the molten urea was added to the cylinder and applied to the 180 pound bed of cyanuric acid granules was 4.19 pounds per minute so that the initial weight ratio of the cyanuric acid to the urea was about 43.1.

As the urea was continuously applied to the surface of the free-flowing granules a coating of urea cyanurate was immediately formed on the surface of the granules in the upper portion of the bed. The rotation of the cylinder provided a surface of fresh cyanuric acid as the coated granules were tumbled over the baffle plates (by the rotation of the cylinder) to the bottom of the bed. The coating of the urea cyanurate was for the most part continuous and varied in thickness from between 1/64 to 1/8 of an inch. The coating on the granules was converted, by the heating temperature of 270° C. to a product consisting of cyanuric acid and a minor amount of ammelide. As the urea was continuously added, the coated spheroidal granules continuously increased in diameter so that the larger granules had diameters of between 1/2 inch and one inch and the weight of the bed of cyanuric acid granules increased from 180 pounds to 220 pounds. As the granules continuously increased in size the surface of the granules consisting of newly formed cyanuric acid and a minor amount of ammelide broke away from the surface of some of the granules thereby continuously forming new smaller granules which assumed a spheroidal shape and had diameters in the range of 1/20 inch to 1/8 inch. Continuous application of urea to the surface of these and other granules of cyanuric acid in the bed resulted in the continuous formation of more cyanuric acid by conversion of the urea cyanurate to cyanuric acid.

The continuous formation of cyanuric acid resulted in an increase in the weight and volume of the bed and the larger granules, which tended to remain at the top of the bed, were continuously discharged through the aforementioned central discharge opening in the end plate.

As the molten urea was contacted with the cyanuric acid, a portion, that is between 20% and 30% of the urea volatilized through the off-gas tube and was recovered by the condenser and was heated and recycled into the rotating cylinder as above-described. Also some of the urea, about 10% by weight, decomposed into $NH_3$ and $CO_2$ but the net yield of cyanuric acid, based on the urea charged and including the recycled urea was 90% of that theoretically obtainable. The $NH_3$ gas which was evolved by the conversion of urea cyanurate to cyanuric acid, was also collected in the off gas tube and recovered as aforementioned by a water trap.

By proceeding as above-described, one hundred twenty-five pounds per hour of a product consisting of cyanuric acid and ammelide were continuously obtained during a 72 hour run. The cyanuric acid so obtained contained 15% ±2% by weight of ammelide and upon acid digestion using the method described in Example II, 98.5 pounds of pure cyanuric acid were obtained for each 100 pounds of the mixture cyanuric acid and ammelide digested. The amount of pure cyanuric acid obtained in the 72 hour period was 8865 pounds.

The dwell time of an increment of urea cyanurate, or the time required for its conversion to cyanuric acid in the heated cylinder is about 60 minutes, but this time can be lessened by increasing the wall temperature to 600° C., the temperature of the cyanuric acid bed to 300° C. and the speed of rotation of the cylinder to 25 to 30 r.p.m.

In this process the weight ratio of the solid granules to molten urea in the cylinder in no instance exceeded 43:1 and as the weight of cyanuric acid granules in the bed increased to 220 pounds the weight ratio of solid granules to urea was 52.5:1. In other words the amount and rate of addition of urea to the granules of cyanuric acid was sufficient only for the urea to react with the cyanuric acid granules to form urea cyanurate. Molten urea was never in evidence on the surface of the granules in the bed.

EXAMPLE V

The apparatus of Example IV was modified by having an opening in only one end of the rotating cylinder. Through this opening passed the urea feed tube, the off-gas tube and the cyanuric acid granules were also collected through this opening. The procedure of Example V was repeated using this apparatus modification and substantially the same yields of cyanuric acid were obtained.

EXAMPLE VI

The process of Example IV was repeated except that the urea was applied to the surface of the cyanuric acid granules at a rate of 5 pounds per minute and the bed of granules was maintained at a temperature of 300° C. One hundred fifty pounds of granules consisting of 80% ±2% cyanuric acid and 20% ±2% of ammelide were obtained per hour. Losses through decomposition of the urea amounted to 12% and an 88% yield of cyanuric acid based on the amount of urea charged was obtained. Ten thousand pounds of pure cyanuric acid (99.95%) were produced during a 72-hour period of continuous operation.

What is claimed is:

1. A process for the manufacture of cyanuric acid which comprises heating at a temperature in the range of from about 180° C. to about 320° C. in an inert atmosphere and at substantially atmospheric pressure, a urea cyanurate substance consisting essentially of cyanuric acid granules coated with a solid coating consisting substantially of urea cyanurate, said cyanuric acid substance being characterized in that the urea cyanurate to cyanuric acid weight ratio is in the range of from about 1:10 to about 1:150, said heating being carried out until said urea cyanurate substance is converted to a material selected from the group consisting of cyanuric acid and mixtures of cyanuric acid and a minor amount of ammelide.

2. A process as in claim 1, wherein the urea cyanurate substance is heated in air at substantially atmospheric pressure and at a temperature in the range of from about 220° C. to about 320° C.

3. A process for the manufacture of cyanuric acid which comprises adding urea to cyanuric acid in a weight ratio of from about 1:10 to about 1:150 at a temperature in the range of from about 180° C. to about 320° C. in air and at atmospheric pressure, said urea being added within said weight ratio at a rate only sufficient for substantially all of said urea to react with said cyanuric acid to form urea cyanurate substantially free of excess urea and thereafter heating the urea cyanurate in air at atmospheric pressure and at a temperature within said range until a product selected from the group consisting of cyanuric acid and a mixture of cyanuric acid and a minor amount of ammelide is formed.

4. A process as in claim 3, wherein the temperature is in the range of from 220° C. to about 320° C.

5. A process for the manufacture of cyanuric acid which comprises continuously adding liquid urea to an agitated bed of cyanuric acid granules maintained at a temperature in the range of from about 220° C. to about 320° C. in air and at atmospheric pressure, the amount of urea added to said cyanuric acid granules being such as to maintain a urea to cyanuric acid weight ratio of from about 1:10 to about 1:150, the rate of addition of said urea to said granules within said weight ratio being only sufficient for substantially all of the urea to react with the cyanuric acid granules and to continuously form cyanuric acid granules coated with urea cyanurate and substantially free of excess urea; continuously heating said urea cyanurate coated granules in said agitated bed in air at atmospheric pressure and at a temperature within said range for a time sufficient to continuously form a product selected from the group consisting of cyanuric acid and a mixture of cyanuric acid and a minor amount of ammelide on the surface of said granules and continuously discharging at least a portion of said product from said agitated bed.

6. A process as in claim 5, wherein the liquid urea is applied to the surface of the cyanuric acid granules in the form of a solution containing at least 70% by weight of urea and not more than 30% by weight of water.

7. A process as in claim 6, wherein small granules are continuously formed by separation of a portion of the surface of some of the granules consisting of cyanuric acid and a minor amount of ammelide.

8. A continuous process for the manufacture of cyanuric acid which comprises continuously applying molten urea maintained at a temperature in the range of about 135° C. to about 180° C. to the surface of free flowing spheroidal cyanuric acid granules maintained at a temperature in the range of about 220° C. to about 320° C. at atmospheric pressure while agitating said granules in a moving bed in an amount such that the weight ratio of urea to the cyanuric acid granules is from about 1:10 to about 1:250 and applying said urea to said cyanuric acid granules at a rate only sufficient for substantially all of the urea to react with the cyanuric acid on the surface of said granules thereby continuously forming at least a partial coating of urea cyanurate on the surface of said granules, continuously heating and agitating the granules coated with said urea cyanurate at atmospheric pressure and at a temperature within said range for a time sufficient to form a mixture of cyanuric acid and a minor amount of ammelide on the surface of said granules, continuously removing a portion of the granules from said moving bed and thereafter converting said granules by acid hydrolysis of the ammelide therein to substantially pure cyanuric acid.

9. A continuous process for the manufacture of cyanuric acid which comprises continuously applying molten urea to the surface of continuously moving, free flowing, spheroidal granules consisting essentially of cyanuric acid and a minor amount of ammelide in a granular bed containing a mixture of said granules and granules having at least a partial coating of urea cyanurate thereon and continuously maintained at a temperature in the range of from about 220° C. to 320° C., the spheroidal granules in said granular bed being characterized in having a diameter of from about 1/20" to about 1", the weight ratio of said urea to cyanuric acid granules being a weight ratio in the range of from about 1:10 to about 1:150, the rate of application of said urea being only sufficient for the urea to react substantially completely with the cyanuric acid on the surface of said granules and to continuously form at least a partial coating of urea cyanurate thereon, continuously heating said granular bed at a temperature within said range thereby continuously converting the urea cyanurate coating on said granules to a product consisting essentially of cyanuric acid and a minor amount of ammelide, continuously applying molten urea to the surface of said last mentioned granules in an amount within said weight ratio and at a rate only sufficient for the urea to react with the cyanuric acid on said granules and to form at least a partial coating of urea cyanurate thereon, continuously removing a portion of the granules consisting essentially of cyanuric acid and a minor amount of ammelide from said granular bed and thereafter converting said granules by acid hydrolysis of the ammelide therein to substantially pure cyanuric acid.

References Cited in the file of this patent
UNITED STATES PATENTS 2,943,088    Westfall _____ June 28, 1960

OTHER REFERENCES

Weltzien: "Annalen Der Chemie," vol. 132, pp. 219–221 (1864).

Beilstein: "Handbuch Der Organischen Chemie," vol. 26, original ed., pp. 242–243 (1937).